United States Patent [19]

Ihringer

[11] 3,965,670

[45] June 29, 1976

[54] EXPANSION BRACELET

[75] Inventor: Gerhard Ihringer, Pforzheim, Germany

[73] Assignee: Rodi & Wienenberger, Aktiengesellschaft, Pforzheim, Germany

[22] Filed: Oct. 18, 1974

[21] Appl. No.: 516,006

[30] Foreign Application Priority Data

May 16, 1974 Germany .......................... 2423734

[52] U.S. Cl. .......................... 59/79 R; 24/265 B; 224/4 E

[51] Int. Cl.² .......................... F16G 13/24

[58] Field of Search .......... 59/79 R, 79 B, 80, 82, 59/91; 224/4 E, 4 H, 4 B, 4 D; 63/5 R, 11 R; 24/265 B, 265 WS, 241 WB, 73 J

[56] References Cited

UNITED STATES PATENTS

| | | | |
|---|---|---|---|
| 2,536,007 | 12/1950 | Milner | 59/80 |
| 2,702,451 | 2/1955 | Schwaibold | 59/80 |
| 2,918,785 | 12/1959 | Bartholoma | 59/79 R |
| 3,601,977 | 8/1971 | Kunzmann | 59/79 R |
| 3,612,365 | 10/1971 | Dintsman | 224/4 E |
| 3,846,976 | 11/1974 | Schaudel | 59/79 R |

FOREIGN PATENTS OR APPLICATIONS

| | | | |
|---|---|---|---|
| 1,023,619 | 1/1958 | Germany | 59/79 R |

*Primary Examiner*—C.W. Lanham
*Assistant Examiner*—Gene P. Crosby
*Attorney, Agent, or Firm*—Michael J. Striker

[57] ABSTRACT

An expansion bracelet, particularly for wrist-watches, has a row of connected links. Each of these links has a plate member, a pair of solid outer members connected to said plate member at opposite lateral sides thereof, as seen with respect to the elongation of the row, and a solid inner member which is located between the outer members and partly projects beyond them in longitudinal direction of the row. The inner member has an underside which faces towards the plate member and is provided with a pair of transversely extending channels. A pair of substantially C-shaped brackets are provided, each having a bight portion pivotably received in one of the channels, and a pair of leg portions. The leg portions of one of the brackets are pivotably connected to the plate member so that this one bracket can be tilted longitudinally of the row out from between the outer members of the link. A pair of biassing springs are provided, each surrounding one of the bight portions. The biassing spring associated with the one bracket permanently opposes the tilting of the latter. The other bracket is connected in the same manner with a plate member of adjacent link, and its associated biassing spring also opposes its tilting.

4 Claims, 11 Drawing Figures

Fig. 1
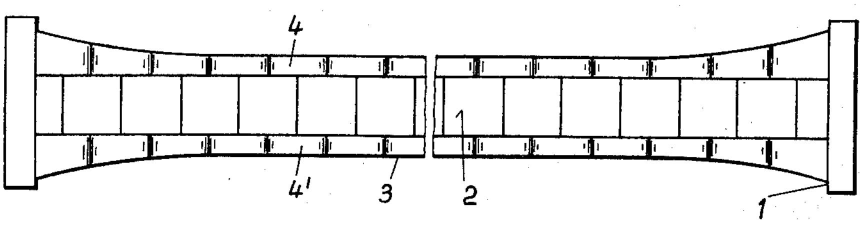
Fig. 2
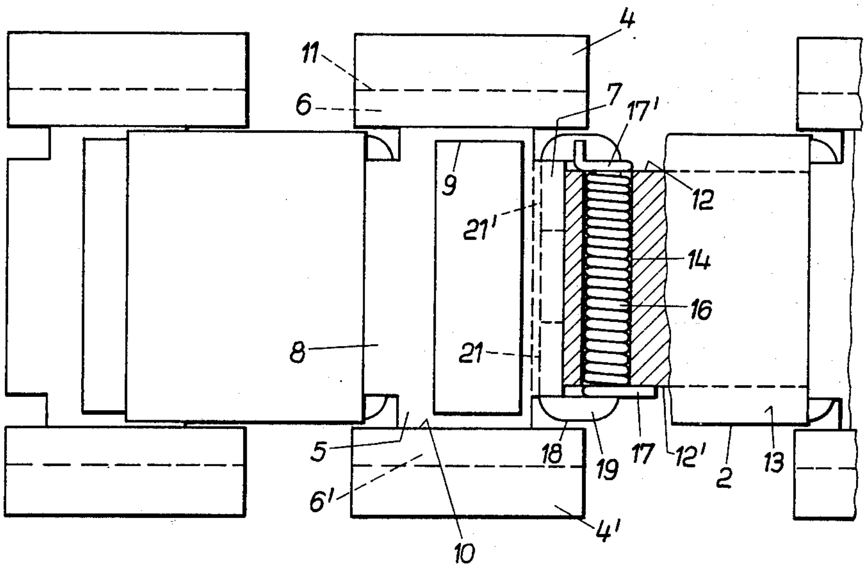
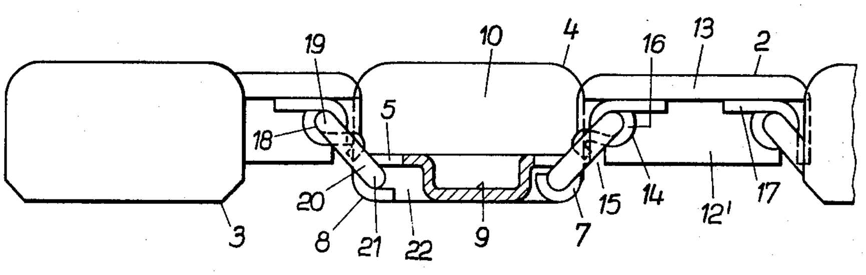
Fig. 3

Fig. 5
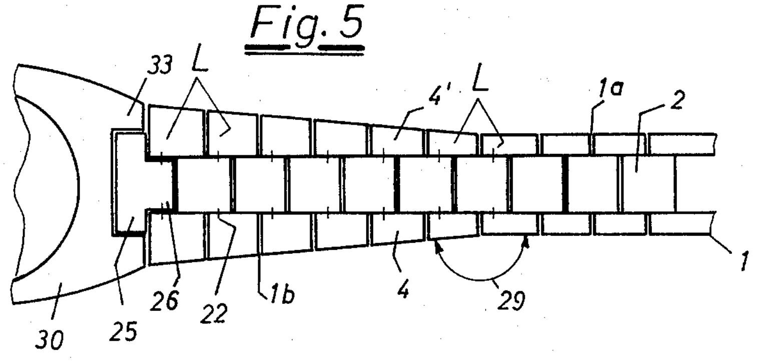
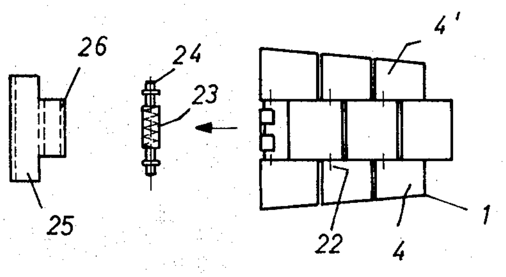
Fig. 6
Fig. 7
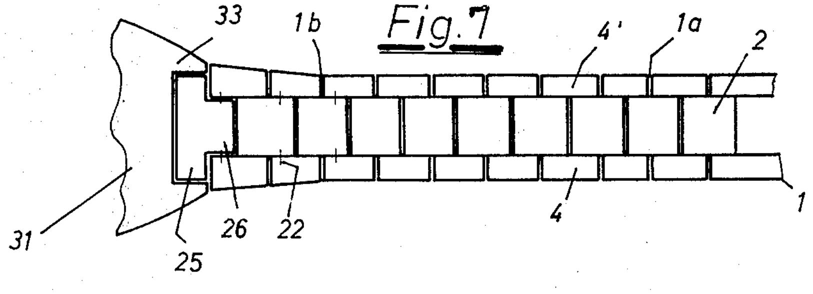
Fig. 8
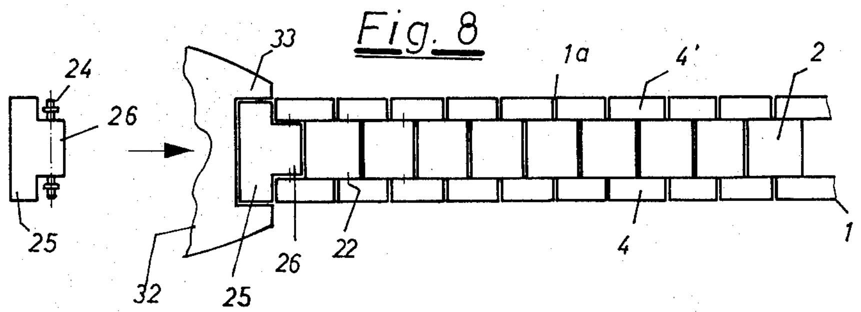

EXPANSION BRACELET

BACKGROUND OF THE INVENTION

The present invention relates generally to a bracelet, and more particularly to an expansion bracelet, especially for wristwatches.

A trend has developed in recent years towards rather large and heavy wristwatches, creating a concomitant demand for similarly massive bracelets, that is watch bands for these watches. It has been observed that customers refuse to accept bracelets which are in conventional manner made of formed sheet metal and are hollow, apparently because they are considered to be too light in weight and too fragile. Moreover, particularly in the case of large-dimensioned wristwatches it is desired that the width of the bracelet be continuously varied, that is that the width increases continuously from the center of the bracelet towards the opposite ends thereof which are to be connected with the watch. For reasons of manufacturing economy this is not possible to do in bracelets whose links are hollow and formed of sheet metal.

Having recognized these problems, the industry has for some time now been producing wristwatch bracelets whose links are of solid cross-section, rather than being hollow and formed of sheet metal. These solid cross-section links can of course be shaped to obtain a continuously changing width of the bracelet, and evidently they have the desired heavier and stronger feeling. However, it has not heretofore been possible to make bracelets of this type so that they can be expanded, because the solid cross-section links of the bracelets did not have the interior space which was previously present in the hollow sheet-metal links and wherein the springs were accommodated which make the expansion of these previous bracelets possible. In many instances this absence of the expansion feature is felt to be a substantial disadvantage. It is now no longer possible to simply pull the bracelet with the watch onto or off the wrist; instead, a closure is required which engages two ends of the bracelet. Of course, whenever the closure is opened or is closed, there is the danger that the bracelet with the watch may fall to the ground and become damaged. Moreover, in most instances the closures are not so reliable as to assure that they cannot come open accidentally, with a resultant loss of both the watch and the bracelet. Since the length of the bracelet cannot be changed, that is since it cannot become expanded, it has also been observed that if the bracelet is relatively tight and a swelling of the wrist should occur, for instance in hot weather, the bracelet can exert an annoying pressure upon the wrist.

The copending application Ser. No. 405,592, now U.S. Pat. No. 3,846,976 of Rolf Schaudel discloses a bracelet, particularly for wristwatches, which avoids the aforementioned disadvantages. This expansion bracelet has a row of connected links each of which comprises a plate member having a pair of first edge portions extending transversely of the row, and a pair of second edge portions extending longitudinally of the row. A pair of solid outer members are provided, each being connected to one of the second edge portions and being spaced from one another transversely of the row. A solid inner member is located between the outer members and in part project beyond them in direction longitudinally of the row. The inner member has an underside facing towards the plate member and provided with a pair of transversely extending channels. A pair of substantially C-shaped brackets is provided. Each of these has a bight portion which is pivotably received in one of the channels and a pair of leg portions. The leg portions of one of the brackets are pivotably connected to one of the first edge portions of the plate member so that this one bracket can be tilted longitudinally of the row out from between the outer members of the link. A pair of biassing springs are received in the respective channels in engagement with the respective brackets, and the one associated with the one bracket permanently resists the tilting of the same. The other bracket is to be connected with an adjacent link of the row.

A bracelet so constructed is, evidently, an expansion bracelet with all the advantages of the same. On the other hand, it has the desired massive character in that both the outer members and the inner member are of solid cross-section rather than being hollow and formed of sheet metal. Aside from the desired weight and appearance the bracelet can thus be readily configurated in terms of its surface configuration and of a desired variation of its width, for instance a continuous variation of the same.

However, a further demand is being made very frequently by customers, which cannot be met even by the aforementioned construction of the copending application Ser. No. 405,592. This is the request that the transition between the watch casing and the bracelet be as smooth as possible; i.e. that steps or similar pronounced indicators at the junction between watch casing and bracelet be avoided, so that the two should appear as unified as possible.

This requirement can be met without much trouble if the watch manufacturer also manufactures bracelets for the watches. However, there is a large market for separate expansion bracelets which are purchased either to replace a leather or fabric watch strap, or to replace an original and now damaged expansion bracelet. In such cases the desire for a smooth transition between the watch casing and the bracelet was heretofore almost impossible to satisfy because of the large variety of watch casing shapes.

SUMMARY OF THE INVENTION

It is an object of the present invention to provide an improved expansion bracelet which overcomes this disadvantage.

More especially, it is an object of this invention to provide an expansion bracelet which can be so accommodated to almost any watch casing as to form with the same a smooth transition and provide an improved aesthetic appearance.

In keeping with the above objects, and with others which will become apparent hereafter, one feature of the invention resides in an improved expansion bracelet which, briefly stated, comprises a row of connected links which includes a plurality of terminal links at its respective end portions and which tapers in its width in direction away from these end portions. Each of these links comprises a plate member having a pair of first edge portions extending transversely of said row, and a pair of second edge portions extending longitudinally of said row, a pair of solid outer members each connected to one of these second edge portions and being spaced from one another transversely of said row, a solid inner member located between the outer members and in part projecting beyond them in direction longitudinally of said row, the inner member having an underside facing towards the plate member and being provided with a pair of transversely extending channels. Each link further has a pair of substantially C-shaped brackets, each having a bight portion pivotably received in one of said channels and a pair of leg portions, the leg portions of one of said brackets being pivotably connected to one of said first edge portions of said plate member so that said one bracket can be tilted longitudinally of said row out from between said outer members, and a pair of biassing springs received in the respective channels in engagement with the respective brackets and permanently resisting such tilting thereof. The outer members of at least some of the terminal links are formed upwardly of the plate member with transversely aligned bores. A pair of bars is provided, one for each end portion, and each bar can be inserted into the aligned bores of the outer members of a respective terminal link.

In this manner, the novel bracelet can be accommodated to a particular watch casing, by removing as many of the terminal links at the opposite end portion of the bracelet as is necessary to obtain a smooth transition between the watch casing and the terminal links which are finally connected therewith.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a top view of an expansion bracelet as disclosed in copending application Ser. No. 405,592, in non-expanded condition;

FIG. 2 is a fragmentary top plan detail view, partly in section, showing a portion of the bracelet in FIG. 1 but in expanded condition;

FIG. 3 is a partly sectioned side elevation of the portion in FIG. 2;

FIG. 5 is a fragmentary top plan view of the novel bracelet connected to a watch casing with its widest terminal link;

FIG. 6 is an exploded top plan detail view, showing details of the end portion of the bracelet which in FIG. 5 is shown connected to the watch casing;

FIG. 7 is a view similar to FIG. 5, but illustrates the watch casing as connected to a narrower terminal link of the bracelet;

FIG. 8 is a view similar to FIG. 7, showing the watch casing connected to the narrowest terminal link of the bracelet;

DESCRIPTION OF THE PREFERRED EMBODIMENTS

In FIGS. 1–4, I have illustrated a wristwatch expansion bracelet 1 of the type disclosed in the copending application Ser. No. 405,592 of Rolf Schaudel. An illustration and description of this bracelet herein is considered desirable, so that the disclosure of my novel bracelet as set forth with reference to FIGS. 5–11, may subsequently be more readily understood.

The bracelet 1 in FIGS. 1–4 comprises a row of connected links which together form a center row of members 2 that is bounded laterally by two outer rows 3 composed of members 4 and 4′, respectively.

Figure 4:
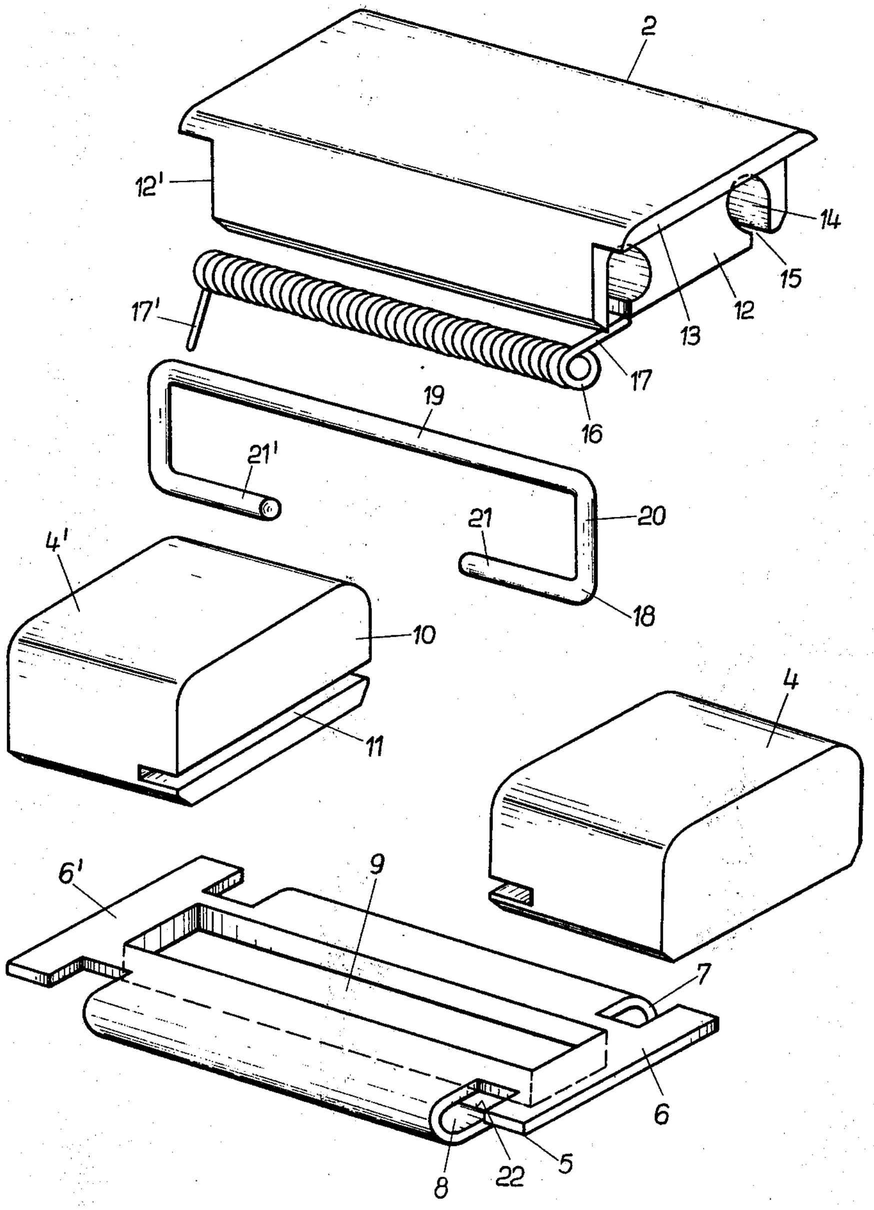
FIG. 4 is an exploded perspective view, showing the components of a link of the bracelet in FIGS. 1–3.
Figure 9:
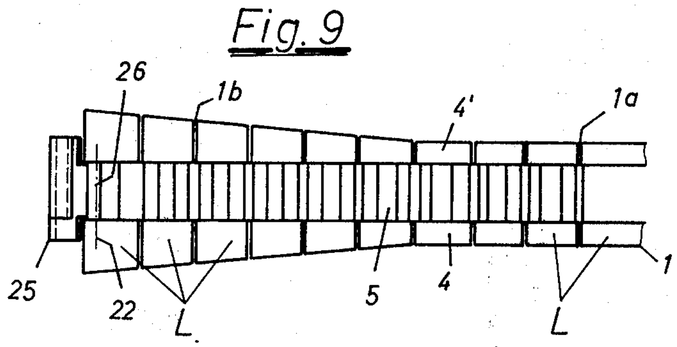
FIG. 9 is a bottom-plan view of one end portion of the novel bracelet.
Figure 10:
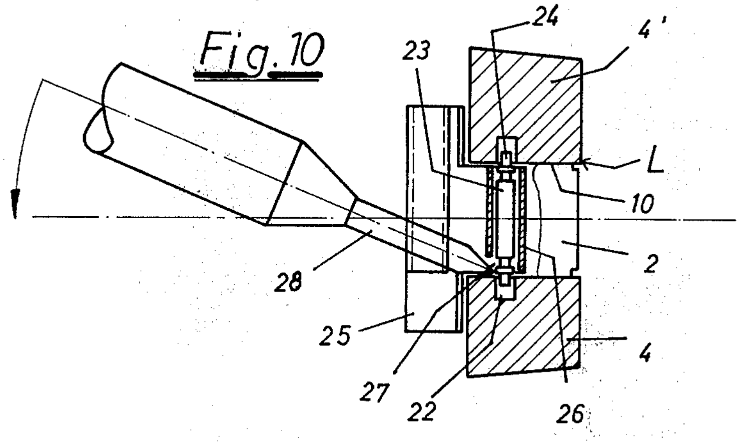
FIG. 10 is a fragmentary section, in bottom view, showing the removal of a connecting bar from one of the terminal sections.

As FIGS. 2–4 show more clearly, each link of the novel expansion bracelet is composed of one of the solid cross-section inner members 2 and two of the solid cross-section outer members 4, 4′ which are located at the opposite lateral sides of the respective member 2. There is further provided a plate member 5 extending transversely of the elongation of the row and having substantially T-shaped lateral edge portions 6, 6′ (see FIG. 4) and transverse edge portions which extend between the edge portions 6, 6′. One of these transverse edge portions is identified with reference numeral 7 and formed to tubular configuration, defining a passage which is open at its opposite ends. The other transverse edge portion is identified with reference numeral 8 and formed to hook-shaped configuration so that the passage which it defines is open not only at its opposite ends but also laterally.

The plate member 5, which is of sheet metal, is formed with one or more (only one shown) profiling 9 which serves as a reinforcement for the plate member 5, i.e. to reinforce it against bending.

The mutually facing edge faces 10 of the members 4, 4′ are each provided with a slot 11 extending in parallelism with the elongation of the row of links, and the end portions 6, 6′ of the plate member 5 are each received in one of these slots and rigidly connected therein, for instance by means of press-forming or the like. Thus, the members 4, 4′ and 5 constitute a unit with one another.

The link further comprises a solid cross-section inner member 2 which in the non-expanded condition of the bracelet (compare FIG. 1) is located halfway between the members 4, 4′ whereas its other half projects outwardly from between them in the longitudinal direction of the bracelet, being located between corresponding members 4, 4′ of the next adjacent link. The lateral edge faces 12, 12′ of each member 2 are partly recessed as indicated in FIG. 4 so that a projection 13 is obtained. Downwardly below the projection 13 the edge faces 12, 12′ are provided with a pair of bores forming passages 14 which each extend from one of the edge faces to the other. These passages of course extend transversely of the elongation of the bracelet and it will be seen that in direction towards the underside of the member 2, that is the side which faces towards the plate member 5, there are slots 15 provided which communicate with the passages 14 over the entire length of the latter. The slots 15 are laterally offset from the respective central axes of the passages 14.

Each of the passages 14 accommodates a helical spring 16 (only one shown) which is provided at its opposite ends with transversely extending projecting portions 17, 17′. The purpose of the slots 15 is to permit the ready insertion of these springs 16 into the respective passages 14, which is accomplished in that the projection 17 or 17′ at that end of the spring 16 which is to be the leading end as the spring is inserted, is made to move through the respective slot 15 during such insertion. Each of the passages 14 further coacts with a substantially C-shaped bracket (only one shown in FIG. 4), a bight portion 19 of which extends through the respective passage as well as through the spring 16 therein. The insertion of these brackets identified with reference numeral 18, is of course again made possible by the presence of the slots 15. Each bracket can freely turn within the respective spring 16. The two leg portions at the opposite ends of the bight portion 19 are located outside the member 2. One part 20 of each leg portion is located in the clearance created between the respective members 4, 4′ and the member 2, due to the presence of the recess in the end faces 12, 12′, and another part 21, 21′ of the respective leg is received in either the passage formed by the edge portion 7 or the passage formed by the edge portion 8. Again, the legs or more particularly the parts 21, 21′ thereof, are freely pivotable in these respective passages. The parts 20 are protected and concealed from view by the projecting portions 13.

When the components are connected with one another the springs 16 are torsionally stressed, with one of the projections, here the projection 17, abutting the underside of the associated projection 13, and the other projection 17′ abutting the associated part 20 of the bracket 18. Thus, the bracket 18 is permanently tilted by the action of the spring 16 to a position inwardly of the link, in which the member 2 is located halfway between the members 4, 4′, the term halfway here referring to the longitudinal direction of the bracelet. Evidently, when a pull is exerted in longitudinal direction on the bracelet, the spring action is overcome and the member 2 is moved outwardly from between the members 4, 4′ by tilting of the associated bracket 18 in the corresponding direction, to the position shown in FIGS. 2 and 3. When the pull is subsequently relaxed, the spring will restore the member 2 to its former position.

It goes without saying that the other bracket of each of the members 2 is similarly connected with a plate member 5 of the next adjacent link, as is diagrammatically suggested in FIGS. 2 and 3.

It is desirable that such bracelets be adjustable in their length, to accommodate them to thicker or thinner wrists. According to the present invention this can be readily done by adding or removing individual links. It is merely necessary to move the parts 21, 21′ of a respective bracket 18 out through the open side 22 of the passage defined by the hook-shaped edge portion of a plate member 5, so that an entire link can be removed or, conversely, can be added.

The novel bracelet 1 of FIGS. 5–11 has largely the same components as the bracelet in FIGS. 1–4; therefore, it is deemed desirable to employ the same reference numerals in FIGS. 5–11 as in FIGS. 1–4, so as to facilitate cross-reference between these Figures.

It will be seen that in FIGS. 5–11 I have additionally designated the center portion of the bracelet with reference numeral 1*a*, and the two opposite end portions (which are mirror-symmetrical, so that only one need be shown for an understanding of the invention) are identified with reference numeral 1*b*. As the width of the bracelet tapers in direction rearwardly of the respective end portions 1*b*, it is clear (compare for example FIG. 5) that consecutive ones of the terminal links L which make up the respective end portions 1*b* will be of successively narrower width. In accordance with the disclosure of the aforementioned copending application, and as described with reference to FIGS. 1–4, each link can be disconnected from (or reconnected to) respective other links L. However, in itself this feature does not make it possible to meet the object of the present invention, i.e. to obtain a smooth transition between the watch casing 30 and the respective terminal links L.

According to the present invention I therefore provide the members 4, 4′ of at least some of the terminal links L in the respective end portions 1*b*, with transversely aligned bores 22 in their juxtaposed surfaces 10. These bores 22 are advantageously blind bores and are located upwardly of the respective plate member 5. Into these aligned bores 22 the end portions 24 of a connecting bar 23 may be inserted; such bars are advantageously the conventional spring bars which can be temporarily shortened by axially telescoping them against the force of a biassing spring.

Figure 11:
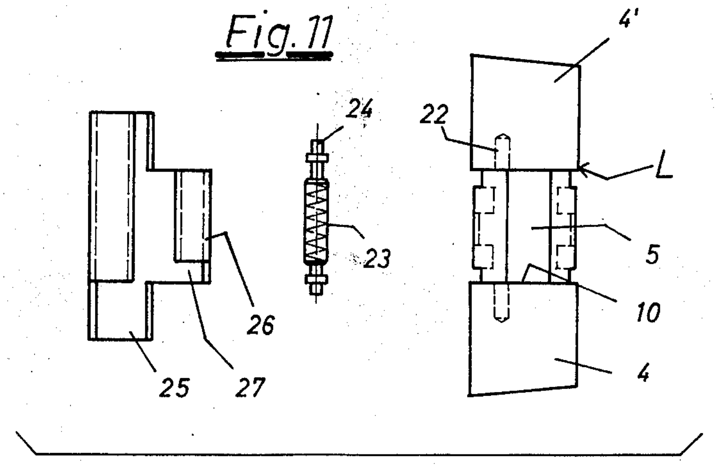
FIG. 11 is an exploded view, showing the elements of FIG. 10 in separated condition.

A hook-shaped connecting element 25 (one shown) is provided for each end portion 1*b* and embraces the associated spring bar 23 with its portion 26, so that the element 25 can pivot about the associated spring bar 23. A cut-out is stamped out of, or otherwise formed in, the portion 26, to permit the insertion of a tool 28 (see FIG. 10) which is used to exert axial pressure on the spring bar 23 to telescope the same against the spring bias, so as to temporarily shorten the spring bar 23 and dislodge it from the respective bores 22. When this is done, the element 25 becomes disconnected (together with the spring bar 23) from the link L with which it was previously connected, as shown in FIGS. 6 and 11.

It will now be clear, and is plainly shown in FIGS. 5–11, that a smooth transition between the watch casing and the respective terminal links L can be obtained by removing one or more of the terminal links L until one is reached whose width is such as to afford this smooth transition. The decrease in the width of successive terminal links L is the result of the taper of the end portions 1*b* toward the center portion 1*a*, and a further decrease is obtained due to the angle 29 included between the links L of center portion 1*a* and the links L of the end portions 1*b*.

Since the width decrease between consecutive links L of the end portions 1*b* amounts in each case to only a few tenths of a millimeter, the bracelet 1 can be readily accommodated to almost all watch casings 30 (FIG. 5), 31 (FIG. 7), and 32 (FIG. 8) having lugs 33 of differential width. When an appropriate number of links L has been removed from the end portions 1*b*, the spring bars 23 with their associated elements 25 are installed in the bores 22 of these links which are now the terminal ones, and the bracelet is then ready for connection to the respective watch casing. The accommodation to different watch casings 30, 31 and 32 is illustrated in FIGS. 5, 7 and 8, where different numbers of terminal links L have been removed in order to obtain the desired smooth transition between bracelet and watch casing.

In the event that the removal of terminal links L should make the bracelet too short for its intended use, additional links L may be added to the center portion 1*a* until the desired length is restored.

It is evident that the bores 22 need not be blind bores, and that the spring bars 23 could then be replaced by pins, rods, screws or other suitable elements, which for the sake of convenience I prefer to generally call "bars" in the appended claims.

It will be readily appreciated that the present invention thus avoids the disadvantages which have been outlined with respect to the prior art, while retaining those features thereof which are desirable.

It will be understood that each of the elements described above, or two or more together, may also find a useful application in other types of constructions differing from the types described above.

While the invention has been illustrated and described as embodied in a wristwatch expansion bracelet, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An expansion bracelet, particularly for wristwatches, comprising a row of connected links which includes at its end portions a plurality of terminal links and which tapers in its width in direction inwardly of said end portions, each of said links comprising a plate member having a pair of first edge portions extending transversely of said row, and a pair of second edge portions extending longitudinally of said row, a pair of solid outer members each connected to one of said second edge portions and being spaced from one another transversely of said row, a solid inner member located between said outer members and in part projecting beyond them in direction longitudinally of said row, said inner member having an underside facing towards said plate member and provided with a pair of transversely extending channels, a pair of substantially C-shaped brackets, each having a bight portion pivotably received in one of said channels and a pair of leg portions, the leg portions of one of said brackets being pivotably connected to one of said first edge portions of said plate member so that one bracket can be tilted longitudinally of said row out from between said outer members, and a pair of biasing springs received in the respective channels in engagement with the respective brackets and permanently resisting such tilting thereof, the outer members of at least some of said terminal links being formed upwardly of the associated plate members with transversely aligned bores; a pair of telescopable spring bars, one for each end portion of said row, each spring bar being insertable into and removable from the aligned bores of said outer members of respective ones of said terminal links for releasably attaching connecting members to the respective terminal links; and a pair of hook-shaped connecting members each having a substantially tubular portion embracing the respective spring bar and being provided with a cutout permitting insertion of a tool to compress said spring bar so that the latter may be removed from said aligned bores after insertion thereinto.

2. An expansion bracelet as defined in claim 1, wherein said outer members of each link have mutually juxtaposed surfaces, and wherein said aligned bores are formed in said surfaces.

3. An expansion bracelet as defined in claim 1, wherein one of said first edge portions is formed to tubular configuration and defines an open-ended passage, and the other of said first edge portions is formed to hook-shaped configuration and defines a passage which is open at its ends and also intermediate the latter, said leg portions of said one bracket being partly received in one of said passages.

4. An expansion bracelet as defined in claim 3, wherein said leg portions each include one part which is spaced from and substantially parallels said bight portion and is received in said one passage, and another part which connects said one part and said bight portion and is located between said inner member and a respective one of said outer members.

* * * * *